(12) United States Patent
Raghunath et al.

(10) Patent No.: US 8,117,620 B2
(45) Date of Patent: Feb. 14, 2012

(54) TECHNIQUES FOR IMPLEMENTING A COMMUNICATION CHANNEL WITH LOCAL AND GLOBAL RESOURCES

(75) Inventors: Arun Raghunath, Beaverton, OR (US); Vinod K. Balakrishnan, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 1538 days.

(21) Appl. No.: 11/086,617

(22) Filed: Mar. 21, 2005

(65) Prior Publication Data

US 2006/0212872 A1    Sep. 21, 2006

(51) Int. Cl.
*G06F 9/46* (2006.01)
*G06F 15/173* (2006.01)
*G06F 12/02* (2006.01)
*H04L 12/28* (2006.01)

(52) U.S. Cl. ........ 718/105; 718/100; 718/104; 718/108; 709/223; 370/258; 711/1

(58) Field of Classification Search .................. 718/104, 718/105; 709/223; 711/1
See application file for complete search history.

(56) References Cited

U.S. PATENT DOCUMENTS

| 5,951,633 | A | * | 9/1999 | Polcyn | 718/104 |
| 5,983,308 | A | * | 11/1999 | Kerstein | 710/263 |
| 6,134,619 | A | * | 10/2000 | Futral et al. | 710/112 |
| 6,266,686 | B1 | * | 7/2001 | Bistry et al. | 708/204 |
| 6,532,509 | B1 | * | 3/2003 | Wolrich et al. | 710/240 |
| 2005/0038951 | A1 | * | 2/2005 | Remedios | 711/1 |

OTHER PUBLICATIONS

Adiletta et al. "The Next Generation of Intel IXP Network Processors", 2002, Intel Technology Journal, vol. 6, Issue 3, pp. 1-93.*

* cited by examiner

*Primary Examiner* — Kenneth Tang
(74) *Attorney, Agent, or Firm* — Kacvinsky Daisak, PLLC

(57) ABSTRACT

Apparatus, system, and method including a local resource to transfer information between a first processing unit and a second processing unit; and a global resource to transfer information between said first processing unit and said second processing unit, and to transfer information between said first processing unit and a third processing unit if said local resource is full are described.

16 Claims, 6 Drawing Sheets

TECHNIQUES FOR IMPLEMENTING A COMMUNICATION CHANNEL WITH LOCAL AND GLOBAL RESOURCES

BACKGROUND

This application relates to a method for managing resources in a processor system. Processors such as microprocessors and central processing units (CPU's), among others, include logic circuitry that respond to a process residing in an execution space in a memory associated with the processor. Some processors such as network processors are designed to process streams of data packets received over a network such as a wide area network (WAN) and transmit the data packets to appropriate local destinations. Due to particular attributes of the packet workload, the allocation of specific processor resources to the different processing functions may have to be dynamically adapted. Such dynamic allocations, however, may not always utilize the best available packet channel implementation, may require packet data migration, and may lead to packet loss during the processor allocation transition phase.

DETAILED DESCRIPTION

Figure 1:
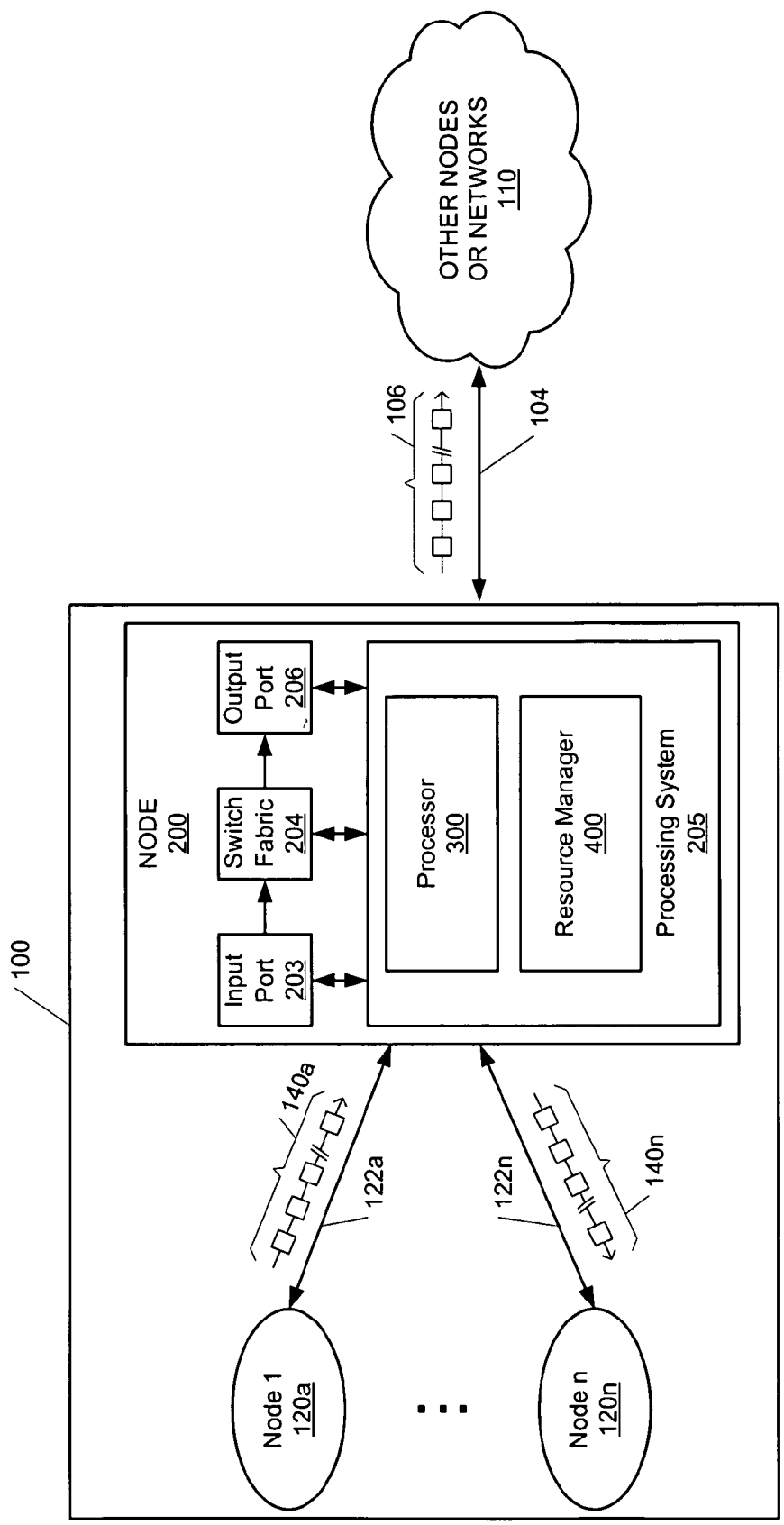
FIG. 1 illustrates one embodiment of a system.

FIG. 1 illustrates one embodiment of a system. FIG. 1 illustrates a block diagram of a system 100. In one embodiment, the system 100 may comprise, for example, a communication system having a plurality of nodes 120a through 120n (120a-n) and node 200. Node 200 may comprise, for example, a network forwarding device. Examples of a network forwarding device may comprise router, switch, bridge, hub, gateway, wireless access point (WAP), among others. A network forwarding device may comprises one or more line cards and a switch fabric, for example. The system 100 also may communicate with other nodes or network(s) 110 (other network), for example. In one embodiment, a node may comprise any addressable physical or logical entity in the system 100. Examples of a node may comprise, for example, a computer, server, workstation, laptop, ultra-laptop, handheld computer, telephone, cellular telephone, pager, walkie-talkie, router, switch, bridge, hub, gateway, wireless access point (WAP), personal digital assistant (PDA), television, motion picture experts group audio layer 3 device (MP3 player), global positioning system (GPS) device, electronic wallet, optical character recognition (OCR) scanner, medical device, camera, and so forth. In one embodiment, the address may comprise, for example, a network address such as an internet protocol (IP) address, a device address such as a media access control (MAC) address, and so forth. The embodiments are not limited in this context.

In one embodiment, the system 100 may comprise a communication network such as, for example, a packet-switched network. Packet switching in this context may refer to communicating information over a network in the form of relatively short bundle of data, usually in binary form, and organized in a specific way for transmission in accordance with one or more communications protocols. A packet in this context may refer to a set of information of a limited length, with the length typically represented in terms of bits or bytes. An example of a packet length might be 1000 bytes. The system 100 may be arranged to communicate different types of information, such as media information and control information. The information may be communicated between nodes 120a-n and node 200 through links 122a-n, and between node 200 and the other network(s) 110 through link 104, for example. Media information may refer to any data representing content meant for a user, such as voice information, video information, audio information, text information, numeric symbols, alphanumeric symbols, graphics, images, and so forth. Control information may refer to any data representing commands, instructions or control words meant for an automated system. For example, control information may be used to route media information through a system, or instruct a node to process the media information in a predetermined manner. In the system 100, the information may be transferred in the form of packets. For example, node 200 may receive an input stream of communications 140a-n and 106 (e.g., data packets) from any one of the nodes 120a-n and the other network(s) 110 via links 122a-n and 104, for example. Node 200 may process the communications 140a-n, 106 and transmit an output stream of the processed communications to any one of the nodes 120a-n, 110 via links 122a-n, 104, for example.

In the system 100, nodes 120a-n and node 200 may communicate media and control information in accordance with one or more protocols. Similarly, the system 100 and the other network(s) 110 also may communicate such media and control information in accordance with one or more protocols. In one embodiment, a protocol may comprise a set of predefined rules or instructions to control how the nodes communicate information between each other. The protocol may be defined by one or more protocol standards as promulgated by a standards organization, such as the internet engineering task force (IETF), international telecommunications union (ITU), the institute of electrical and electronics engineers (IEEE), and so forth. Some examples of a protocol include the transfer control protocol/internet protocol (TCP/IP), the hypertext transfer protocol (HTTP), among others.

The system 100 may be implemented as a wired communication system, a wireless communication system, or a combination thereof. Although the system 100 may be illustrated using a particular communications media by way of example, it may be appreciated that the principles and techniques discussed herein may be implemented using any type of communication media and accompanying technology. The embodiments are not limited in this context.

When implemented as a wired system, the links 122a-n connecting nodes 120a-n and node 200 may be arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The communications media may be connected to a node using an input/output (I/O) adapter. The I/O adapter may be arranged to operate with any suitable technique for controlling information signals between the nodes 120a-n using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, the links 122a-n connecting nodes 120a-n and node 200 may be arranged to communicate information over one or more types of wireless communication media. An example of a wireless communication media may include portions of a wireless spectrum, such as the radio-frequency (RF) spectrum. The wireless nodes may include components and interfaces suitable for communicating information signals over the designated wireless spectrum, such as one or more antennas, wireless transmitters/receivers ("transceivers"), amplifiers, filters, control logic, and so forth. Examples for the antenna may include an internal antenna, an omni-directional antenna, a monopole antenna, a dipole antenna, an end fed antenna, a circularly polarized antenna, a micro-strip antenna, a diversity antenna, a dual antenna, an antenna array, and so forth. The embodiments are not limited in this context.

In one embodiment, the system 100 may comprise a network. In one embodiment, a network may comprise any type of network, such as a local area network (LAN), a metropolitan area network (MAN), a wide area network (WAN), a wireless LAN (WLAN), or other network. Node 200 also may be adapted to connect the network 100 with the other network(s) 110, for example, such as, the Internet and/or another LAN, MAN, LAN, or WLAN. Node 200 also may be connected with the other network(s) 110 via any suitable medium, including a wireless, copper wire, and/or fiber optic connection using any suitable protocol (e.g., TCP/IP, HTTP, etc.), for example.

In one embodiment, node 200 may comprise a processing system 205. In one embodiment, the processing system 205 may comprise a processor 300, which may comprise any suitable processing device or system, including a microprocessor, a network processor, an application specific integrated circuit (ASIC), programmable logic device (PLD), a programmable gate array (PGA), a field programmable gate array (FPGA), digital signal processor (DSP), or similar device. In one embodiment the processor 300 may comprise a network processor or microprocessor designed specifically for processing communication, such as, for example, for processing a stream of data packets. In one embodiment, a network processor may comprise a programmable integrated circuit comprising an instruction set optimized to support the operations that are needed in networking, such as processing streams of data packets, for example. These network processors may include, for example, processors based on the Intel® Internet Exchange Architecture (Intel® IXA), and include the IXP2800, IXP2400, and IXP1200 processors, made by Intel® Corporation, Santa Clara, Calif. One embodiment of the processor 300 is illustrated below in FIG. 3 and the accompanying text.

In one embodiment, the processing system 205 communicates with one or more input ports 203, a switch fabric 204, and one or more output ports 206. In one embodiment, the stream of communications 140a-n and 106 may be received by node 200 on the input ports 203 that provide a physical link to the other network 110 and are in communication with the processing system 205 that controls the entering of the incoming communications 140a-n and 106. The processing system 205 also communicates with the switching fabric 204 that interconnects the input ports 203 and the output ports 206. The output ports 206, which are also in communication with the processing system 205, are used for scheduling transmission of the communications 140a-n and 106 to the other network 110. In one embodiment, the processing system 205 may be implemented as one of the one or more line cards of node 200.

In one embodiment, node 200 may include one or more line cards 1-m. Line cards 1-m may be used to process data on a network line. Each line card acts as an interface between a network and a switch fabric. The line card may convert the data set from the format used by the network to a format for processing. The line card also may perform necessary processing on the data set. This processing may include further translation, encryption, error checking, and the like. After processing, the line card converts the data set into a transmission format for transmission across the switch fabric.

The line card also allows a data set to be transmitted from the switch fabric to the network. The line card receives a data set from the switch fabric, processes the data set, and then converts the data set into the network format. The network format can be, for example, ATM or a different format. In one embodiment, line cards 1-m may comprise half-duplex processor based line cards. A half-duplex processor based line card may use multiple network processors to achieve full duplex network communications. For example, the half-duplex processor based line card may use a first network processor for inbound traffic and a second network processor for outbound traffic. Inbound data traffic is typically traffic from the media to the switch fabric, while outbound traffic is typically data traffic from the switch fabric to the media. Each network processor typically communicates with the switch fabric in only one direction.

In one embodiment, the processing system 205 may comprise a resource manager 400 that determines the specific system resources that are made available to the applications. This may include choosing the specific communication mechanism between processing functions, dynamically adapting the processor allocation to different processing functions based on the processor's 300 current packet transfer workload, etc. The dynamic processor allocation adaptation may increase the overall packet channel throughput in a defined packet channel. In one embodiment, the resource manager 400 dynamically adapts the processor allocation to utilize the best overall channel implementation, obviate the need for data migration, and minimize packet loss during the processor allocation transition phase. As used in this context, in one embodiment a resource may comprise any facility of a computing system or operating system required by a job or task, including memory, input/output devices, registers, and processing unit. In one embodiment, a resource may comprise any system resource or register suitable to transfer information between the processor 300, or sub-elements of the processor 300, and locations internal or external to the processor 300. In one embodiment, the resource may be local to a subset of the sub-elements of the processor 300 or global to the processor 300, and the communication might entail transferring data between locations internal or external to the processor 300, for example. In one embodiment, these locations may comprise memory devices such as dynamic random access memories (DRAMs), static random access memories (SRAMs), and the like, for example.

The resource manager 400 may be used to implement software context pipelines across various processing units of the processor 300 (in one embodiment processing units may comprise processing engines, which are described below with respect to FIG. 3). The software context pipeline may require certain features such as hardware-assisted global resource registers (e.g., scratch-memory resident producer/consumer rings, sometimes referred to as scratch-rings) and local resources (e.g., private registers between adjacent processing units, sometimes referred to as next-neighbor register rings) that allow efficient implementation of producer and consumer communication. In one embodiment, a combination of local resources and global resource registers under the control of the resource manager 400 may be used to implement a packet channel. These hardware-managed mechanisms rapidly pass state from one processing unit to the next, for example. A framework for implementing processing functions as reusable building blocks (e.g., microblocks) and for combining them in desired fashion to form functional pipelines may be provided by the Intel® IXA architecture, for example.

Generally, packet processing involves accesses to internal and external memories such as scratch memory, SRAM, DRAM, etc. The number of memory accesses per stage depends on the data movement model for that stage. Hardware assisted global resource registers such as scratch-rings help in implementing communication between processing units that are not adjacent to each other. On the other hand, hardware assisted local resources such as next-neighbor rings help in implementing communication between processing units that are adjacent to each other. Local resources are more efficient and have less impact on the rest of the system. Local resources do not consume system bus bandwidth that otherwise may be needed by other system components, for example.

In one embodiment, a local resource may comprise a dedicated register set used to implement a packet channel to transfer information between the processor 300 and adjacent sub-elements of the processor 300, or between adjacent processing units, for example. In one embodiment, a local resource may comprise a memory buffer, ring buffer, register, or other interprocess communication (IPC) mechanism such as a next-neighbor ring, for example to establish a communication channel in a distributed computing environment.

Local resources such as next-neighbor rings may be used as an efficient method to pass data from one processing unit to an adjacent processing unit, for example, when implementing a data-processing pipeline. The local resources can supply instruction source operands; when a local resource is the destination of an instruction, that value is written in the next processing unit. In one embodiment, the local resources also may be configured to act as circular rings instead of addressable registers. In this mode the data is read from the head of the ring, and is written to the tail of the ring, for example. The head and tail pointers may be maintained in hardware in the processing units. For embodiments that do not require the use the local resources for intra-processing unit communications, the processing unit may be put into a mode where an instruction with a local resource as destination will write the local resource in the same processing unit. Embodiments of the processor 300 may provide a variety of low-latency communication mechanisms among the various processing units and the processor 300. In one embodiment, these communication mechanisms may comprise dedicated high-speed data-paths between neighboring (e.g., adjacent) processing units, datapaths between all processing units, shared on-chip scratchpad memory, and shared first-in-first-out (FIFO) ring buffers in scratchpad memory and SRAM. These features enable the processing units to form various topologies of software pipelines flexibly and efficiently, allowing processing to be tuned to specific applications and traffic patterns. This combination of programming flexibility and efficient interprocess communication provides improved performance headroom while minimizing processing latency. When a single producer communicates with a single consumer, local resources may be employed. This provides a very low latency private data path.

In one embodiment, a global resource register also may be used to implement a packet channel to transfer information between any elements and sub-elements of node 200 and the processor 300, and/or between adjacent and non-adjacent processing units. In one embodiment, a global resource may comprise a memory buffer, ring buffer, register, or IPC mechanism such as a scratch-ring, for example, that are not limited to transferring information between adjacent processors or sub-elements thereof.

Node 200 may be implemented on any suitable computing system or device (or combination of devices). One embodiment of node 200 is described below with respect to FIG. 2 and the accompanying text. Although the disclosed embodiments are explained below in the context of node 200, the disclosed embodiments of the resource manager 400 may be implemented on any device that routes, generates, forwards, or otherwise manipulates communications between two or more devices (e.g., communications between two nodes interconnected by a computer network, or communications between two devices interconnected by a high speed backplane fabric, etc.). In one embodiment, node 200 may comprise any suitable computing device. In one embodiment, the resource manager 400 may comprise a software application that may be implemented or executed on this computing device. In one embodiment, the resource manager 400 also may comprise a dedicated hardware, such as a circuit, an ASIC, PLD, PGA, FPGA, DSP, any combination of programmed general-purpose computer components and custom hardware components, and so forth, on this computing device. The embodiments are not limited in this context.

The system 100 may represent one embodiment of such a system and, further, the network 110 may have any suitable configuration. For example, the network 110 may include additional nodes, as well as other networking devices (e.g., routers, hubs, gateways, etc.), which have been omitted from FIG. 1 for ease of understanding. Further, it should be understood that the system 100 may not include all of the components illustrated in FIG. 1.

In general operation, system 100 may operate to process (e.g., route, generate, forward, or otherwise manipulate) communications 140a-n (e.g., packets, frames, cells, etc.) between nodes 120a-n and node 200, and to process communications 106 (e.g., packets, frames, cells, etc.) between node 200 and the other network(s) 110, for example. Although FIG. 1 is shown with a limited number of nodes in a certain topology, it may be appreciated that system 100 may include more or less nodes in any type of topology as desired for a given implementation. The embodiments, however, are not limited in this context. Although a communication generally may be referred to herein as a "packet," or a "stream of data packets," the disclosed embodiments, however, are not limited in this context and may be applicable to any type of communication, irrespective of format or content.

In one embodiment, node 200 receives communications 106 (e.g., packets, frames, cells, etc.) from the other network(s) 110 via link 104 and may route the communications 106 to the appropriate node 120a-n or back to the other network(s) 110. Node 200 also receives communications 140a-n from the nodes 120a-n via links 122a-n, and may transmit the communications 140a-n out to the other network(s) 110 or to either node 120a-n. In one embodiment, node 200 also may comprise the resource manager 400 to control where to place the processing functions that schedule the communications 140a-n, 106 or, in one embodiment, what resources it can use to schedule the communications 140a-n, 106 for transmission, whether the communications 140*a-n*, 106 are addressed to a node in the other network(s) 110 or is destined for one of the nodes 120*a-n* in the system 100.

For example, in embodiments of the system 100 where the processor 300 comprises a multi-core packet processor, dynamically adapting the processor 300 allocation to different processing functions based on the packet traffic workload may increase overall packet channel throughput. Under the control of the resource manager 400, such a packet processing system may benefit from communication mechanisms corresponding to different processor allocations. For example, the resource manager 400 may utilize a local resource to implement an adaptive packet channel if the two data flow actors (e.g., any functional packet processing node such as processing units, multiple processors, switches, routers, and the like), it connects are mapped to adjacent processing units of the processor 300. In such an adaptive system, the processor allocation may be changed with minimal packet loss during the transition. Embodiments of the resource manager 400 described herein may implement a packet channel that simultaneously minimizes packet loss while exploiting special IPC mechanisms of local resources such as next-neighbor rings. In one embodiment, the packet channel implementation may comprise using a combination of both local and global resource registers to adapt to the flow of a packet stream and deciding when to switch the packet channel between the local resource and the global resource register, for example. The resource manager 400 enables the processor 300 to adapt to incoming packet data stream workloads while dropping a minimal number of packets during the actual adaptation. The operation of the resource manager is described below in greater detail.

Figure 2:
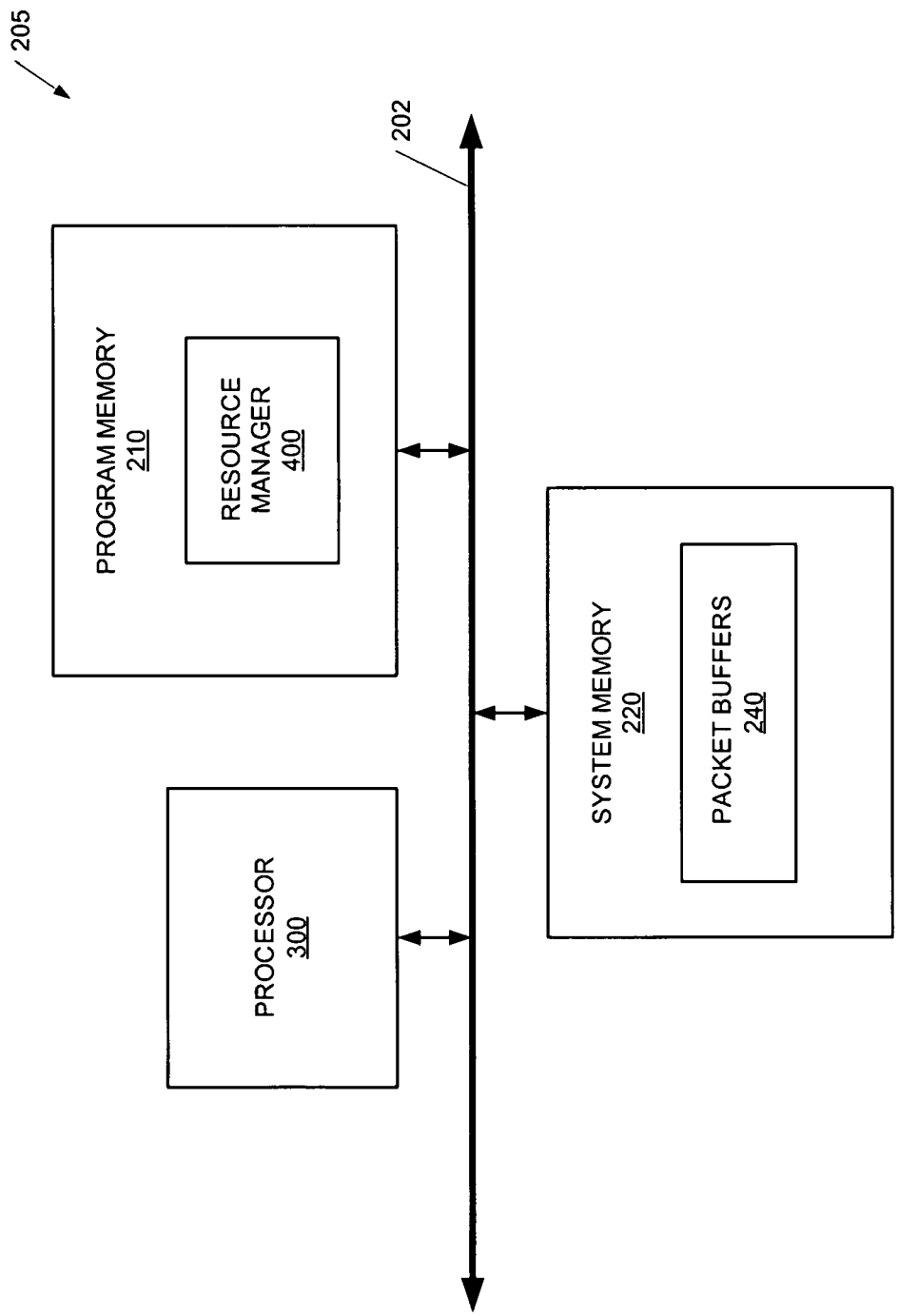
FIG. 2 illustrates one embodiment of a node.

FIG. 2 illustrates one embodiment of a processing system. FIG. 2 illustrates a block diagram of one embodiment of processing system 205. Processing system 205 includes a bus 202 to which various components may be coupled. The bus 202 is intended to represent a collection of one or more buses (e.g., a system bus, a peripheral component interface (PCI) bus, a small computer system interface (SCSI) bus, etc.) to interconnect the components of processing system 205. These buses are represented as a single bus 202 for ease of understanding, and it should be understood that embodiments of processing system 205 are not limited in this context. Processing system 205 may have any suitable bus architecture and may include any number and combination of buses.

Coupled with the bus 202 is a processing device (or devices) such as the processor 300, for example. As discussed above, in one embodiment, the processor 300 may comprise any suitable processing device or system, including a microprocessor, a network processor, ASIC, PLD, PGA, FPGA, DSP, or similar device. An embodiment of the processor 300 is illustrated below in FIG. 3 and the accompanying text.

Also coupled with the bus 202 is program memory 210. In embodiments where the resource manager 400 is implemented as a software routine comprising a set of instructions, these instructions may be stored in the program memory 210. Upon system initialization and/or power up, the instructions may be transferred to on-chip memory of the processor 300, where they are stored for execution by the processor 300. In one embodiment, the program memory may comprise any suitable non-volatile memory. In one embodiment, the program memory 210 may comprise a read-only memory (ROM) device or a flash memory device. In another embodiment, processing system 205 may comprise a hard-disk drive (not shown in figures) upon which the resource manager 400 software may be stored. In yet another embodiment, processing system 205 also may comprise a device (not shown in figures) for accessing removable storage media (e.g., a floppy-disk drive, a CD-ROM drive, and the like) and the resource manager 400 software is downloaded from a removable storage media into memory of the processor 300 (or downloaded into the program memory 210). In yet a further embodiment, upon power up or initialization of processing system 205, the resource manager 400 software is downloaded from one of the nodes 120*a-n* or from the other network(s) 110 and stored in memory of the processor 300 (in which case, program memory 210 may not be needed).

In one embodiment, processing system 205 also may comprise a system memory 220, which is coupled with the bus 202. In one embodiment, the system memory 220 may comprise any suitable type and/or number of memory devices. For example, in one embodiment, the system memory 220 may comprise a DRAM (dynamic random access memory), a SDRAM (synchronous DRAM), a DDRDRAM (double data rate DRAM), and/or a SRAM (static random access memory), as well as any other suitable type of memory. During operation of processing system 205, the system memory 220 may provide one or more packet buffers 240 to store packets received from the nodes 120*a-n* or other network(s) 110. In one embodiment, the packet buffers 240 are stored in a DRAM device (or SDRAM or DDRDRAM).

It should be understood that processing system 205 illustrated in FIG. 2 is intended to represent an example embodiment of such a device and, further, that processing system 205 may include many additional components, which have been omitted for clarity and ease of understanding. By way of example, in one embodiment, processing system 205 may comprise a chip set associated with the processor 300, additional memory (e.g., a cache memory), one or more input devices (e.g., a keyboard, a pointing device such as a mouse, and a scanner or other data entry device), one or more output devices (e.g., a video monitor or an audio output device), as well as additional signal lines and buses. In one embodiment, processing system 205 also may comprise a hard-disk drive and/or a device for accessing removable storage media, both as noted above. Also, it should be understood that processing system 205 may not include all of the components shown in FIG. 2.

Figure 3:
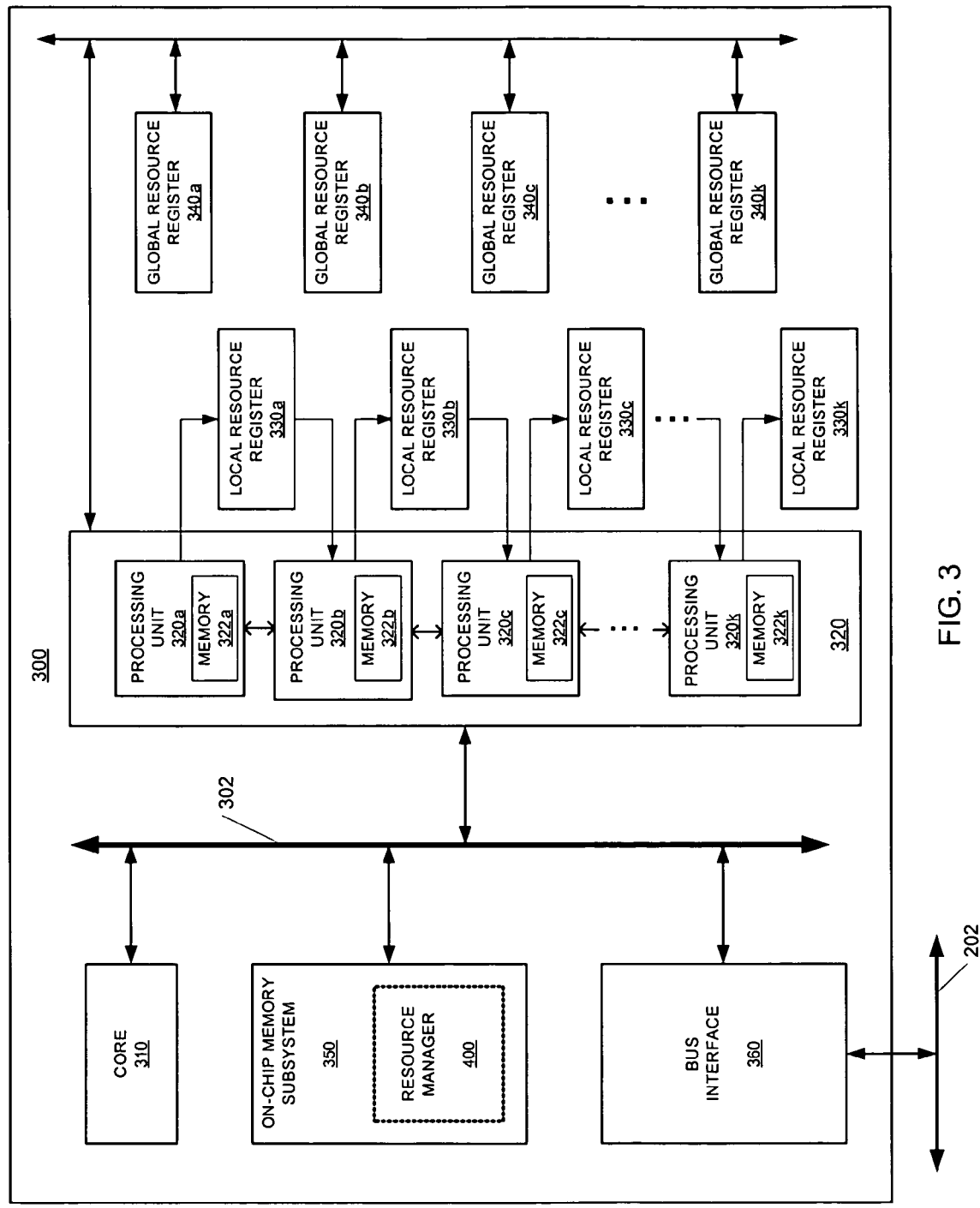
FIG. 3 illustrates one embodiment of a processor.

FIG. 3 illustrates one embodiment of a processor. FIG. 3 illustrates a block diagram of the processor 300. It should be understood, however, that the processor 300 is but one embodiment of a processing device upon which the disclosed embodiments of the resource manager 400 may be implemented. The disclosed embodiments of the resource manager 400 may be implemented on many other types of processing systems and/or processor architectures.

In one embodiment, the processor 300 may comprise a local bus 302 to which various functional units are coupled. The bus 302 is intended to represent a collection of one or more on-chip buses that interconnect the various functional units of the processor 300. Representation of these local buses as a single bus 302 is provided for ease of understanding. The processor 300 may have any suitable bus architecture and may include any number and combination of buses. Embodiments of the processor 300 are not limited in this context.

A core 310 and a number of processing units 320 (e.g., processing units 320*a*, 320*b*, . . . , 320*k*) are coupled with the local bus 302. In one embodiment, the processing units 320*a-k* may represent processing engines. In one embodiment, the processing units 320*a-k* may be daisy chained with one or more local resources 330*a-k* (e.g., next-neighbor rings) that are suited for communication between adjacent processing units 320*a-k*, for example. In one embodiment, the core 310 comprises a general purpose processing system. The processing units 320a-k may transfer communications via global resource registers 340a-k, for example. The core 310 may execute an operating system and control operation of the processor 300. The core 310 also may perform a variety of management functions, such as dispensing instructions to the processing units 320 for execution.

In one embodiment, each of the processing units 320a-k may comprise any suitable processing system, and each may include an arithmetic and logic unit (ALU), a controller, and a number of registers (for storing data during read/write operations), including the local resources 330a-k and the global resource registers 340a-k, for example. In one embodiment, each of the processing units 320a-k may provide for multiple threads of execution (e.g., four). Also, each of the processing units 320a-k may include a memory (i.e., the processing unit 320a includes memory 322a, the processing unit 320b includes memory 322b, and so on). The memory 322a-k of each of the processing units 320a-k may be used to store instructions for execution on that processing units. In one embodiment, one or more of the processing units (e.g., processing units 320b, 320c) stores instructions associated with the resource manager 400 (or instructions associated with certain components of the resource manager 400). In one embodiment, the memory 322a-k of each of the processing units 320a-k may comprise SRAM, ROM, erasable programmable read-only memory (EPROM), or some type of flash memory (e.g., flash ROM). Further, although illustrated as discrete memories associated with a specific processing unit, in an alternative embodiment, a single memory (or group of memories) may be shared by two or more of the processing units 320a-k (e.g., by a time-division multiplexing scheme, etc.).

Also coupled with the local bus 302 is an on-chip memory subsystem 350. Although depicted as a single unit, the on-chip memory subsystem 350 may, and in practice likely does, comprise a number of distinct memory units and/or memory types. For example, such on-chip memory may include SRAM, SDRAM, DDRDRAM, and/or flash memory (e.g., flash ROM). In addition to on-chip memory, the processor 300 may be coupled with off-chip memory (e.g., system memory 220, off-chip cache memory, etc.). As previously noted, in one embodiment, the resource manager 400 is stored in the memory of one or more of the processing units 320a-k. In another embodiment, however, a set of instructions associated with the resource manager 400 may be stored in the on-chip memory subsystem 350 (shown in dashed line in FIG. 3).

The processor 300 may further comprise a bus interface 360 coupled with the local bus 302. The bus interface 360 provides an interface with other components of node 200, including the bus 202. For simplicity, the bus interface 360 is depicted as a single functional unit; however, in practice, in one embodiment, the processor 300 may comprise multiple bus interfaces. For example, the processor 300 may include a PCI bus interface, an IX (Internet Exchange) bus interface, as well as others, and the bus interface 360 is intended to represent a collection of one or more such interfaces.

Embodiments of the processor 300 illustrated and described with respect to FIG. 3 are but one example of a processing device that may find use with the disclosed embodiments of the resource manager 400 and, further, that the processor 300 may have other components in addition to those shown in FIG. 3, which components have been omitted for clarity and ease of understanding. For example, the processor 300 may include other functional units (e.g., an instruction decoder unit, an address translation unit, etc.), a thermal management system, clock circuitry, additional memory, and registers. Also, a processing device may not include all of the elements shown in FIG. 3.

To manage the transmission of the communications 140a-n, 106, or other similar functions associated with the communications 140a-n, 106, the processor 300 executes one or more processes with the processing units 320a-k by assigning portions of the one or more processes, referred to here as process components, to individual processing units 320a-k so that the processes may be efficiently executed by the processor 300. In one embodiment, a process may comprise a complete sequence of instructions executed on communications sent from and/or received by a device on the network. Additionally, in some arrangements a process component is a programmer-identified subset of consecutive instructions included in a process. Furthermore, in some arrangements, a process component is a thread (e.g., an autonomous piece of software that does not complete), a subroutine, a program, or other similar programming structures. Additionally, in some arrangements a process is a group of threads, subroutines, programs, or other similar programming structures. Typically passing data packets between process components on the same the processing units 320a-k is more efficient than passing data packets between process components on the different processing units 320a-k.

In one embodiment, the resource manager 400 may utilize the best available channel implementation as called for by a particular scenario. The local resources 330a-k may be used to implement a communication channel (e.g., packet channel) to transfer communications 140a-n, 106 between the source processing unit 320a and the adjacent sink processing unit 320b. The global resource registers 340a-k may be used to implement communications channels for any other case where the source processing unit 320a is not adjacent to the sink processing unit. In one embodiment, the communication channel implementation under the control of the resource manager 400 may comprise a hybrid of local resources 330a-k and global resource registers 340a-k to implement a communication channel comprising flows of data packets between the source processing unit 320a and the sink processing units 320b, c, for example. When the sink processing units 320b, c keep pace with the communication traffic rate, the resource manager 400 decides which packet channel implementation to use. When the communication traffic bottleneck is in the actors (e.g., source and sink processing units), a channel implementation that can be accessed from multiple processing units is used. This process allows node 200 to create multiple copies of the bottleneck processing unit to assist it in processing the communications. Embodiments of the resource manager 400 may be slightly slower than an implementation using just local resources 330a-k. It should be noted however that whether an actor keeps up or not depends on the workload it is subjected to and this can change over the course of operation of the system. Consequently one would typically resort to using a global resource. The hybrid implementation of the resource manager 400, however, still may be faster than the alternative of using only global resource registers 340a-k. Even an adaptive system that uses local or global resources separately, however, may require channel state migration when the resource type is changed.

In one embodiment, the resource manager 400 may obviate need for channel state migration. For example, the resource manager 400 may avoid the need to migrate the packet flow data that has already been placed on a particular communication channel. As described hereinbelow, the method 'get' ensures that all the communication data placed on a previous communication channel implemented with a local resource 330a-k is first drained before any of the sink processing units 320b, c start reading from the other implementations of the communication channel using global resource registers 340a-k, for example.

In yet another embodiment, the resource manager 400 may minimize the communication loss during the processor allocation transition phase. Further, the resource manager 400 may cause minimal disruption of the code currently running on the processing units 320a-k, while adapting from one processor mapping to another. In one embodiment, the resource manager 400 may utilize at least three processing units 320a, b, c connected in a straight line via local resources 330a, b, c. If the middle processing unit 320b is too slow, then the processor allocation for it may be changed from one to two processing units. In this scenario, the local resources 330a-c used to transfer communications between the processing units 320a-c now have to be changed to the global resource registers 340a-k, which may require a modification of the code for each of the data flow actors to use the global resource registers 340a-k instead of the local resources 330a-c, for example. This code modification in conventional implementations may involve stopping the processing units resulting in disruption of communication traffic. In implementations comprising the resource manager 400, the disruption of communication traffic is not required at all, because the resource manager 400 implementation automatically handles this transition, as can be seen from the figures and accompanying text disclosed below.

Referring to FIGS. 4A-4G, a series of diagrams depict the transfer of data packets between processing units under the control of the resource manager in accordance with one embodiment. The series of diagrams depicts one embodiment of a process executed by the resource manager 400 to dynamically allocate the proper resources to implement a packet channel 450 between a source processing unit 320a and a sink processing unit 320b. In a multi-core packet processing system such as one embodiment of the system 100, it may be shown that dynamically adapting the processor allocation to different processing functions based on the packet traffic workload can increase the overall packet throughput. Such a packet processing system 100 also may be improved by exploiting the improved communication mechanisms corresponding to different processor allocations. For example, in one embodiment, local resources 330a-k may be used to implement one embodiment of a packet channel if the two data flow actors it connects are mapped to adjacent processing units. In such an adaptive system, under the control of the resource manager 400, a minimal number of packets are lost while changing the processor allocations. In one embodiment, the resource manager 400 provides a packet channel implementation that simultaneously minimizes packet loss while exploiting certain IPC mechanisms such as the local resources 330a-k, for example. In one embodiment, for example, the resource manager 400 may execute a decision process to decide when to switch the packet data flow between the local resources 330a-k and the global resource registers 340a-k in order to achieve improved communication throughput. In one embodiment, the resource manager 400 dynamically adapts and improves the processor allocation based on incoming and outgoing packet flow workloads while reducing the number of dropped packets during the adaptation. In one embodiment, the packet channel implementation comprises a combination of the local resources 330a-k and the global resource registers 340a-k and the resource manager 400 decides when to switch between the two resources. The resource manager 400 allows the processor 300 to adapt to incoming packet flow workloads and improve communication throughput while minimizing the number of packets dropped during the actual adaptation.

Figure 4A:
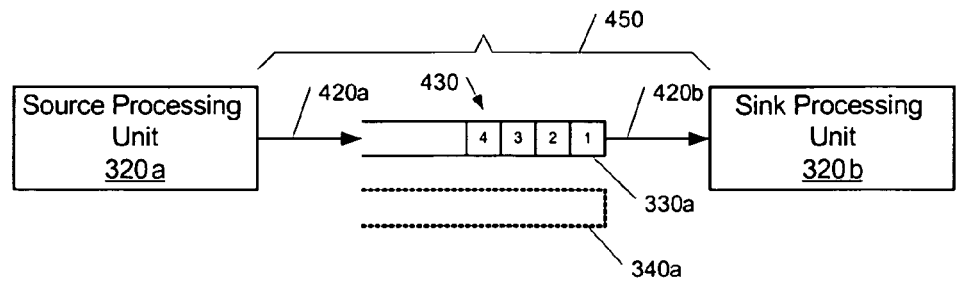
FIGS. 4A-4G illustrate a series of diagrams depicting the transfer of data packets between processing units under the control of a resource manager in accordance with one embodiment.

Referring to FIG. 4A, in one embodiment, the source processing unit 320a transfers data packets $430_{(1,2,3,4)}$ to the sink processing unit 320b through local resource 330a, for example. The source processing unit 320a writes (e.g., executes a 'put' method) the packets $430_{(1,2,3,4)}$ to the local resource 330a via link 420a, for example. The sink processing unit 320b reads (e.g., executes a 'get' method) the packets $430_{(1,2,3,4)}$ from the local resource 330a via link 420b. The global resource register 340a is inactive because the sink processing unit 320b is able to keep up reading packets $430_{(1,2,3,4)}$ from the local resource 330a.

The diagram illustrated in FIG. 4A depicts the packet data flow between the source and sink processing units 320a, b when they are mapped adjacent to each another by the processor 300. As previously disclosed, adjacently mapped processing units 320a, b may use the local resource 330a to set up the packet channel 450 to transfer the packets $430_{(1,2,3,4)}$ therebetween. As previously disclosed, an efficient method of transferring the packets the $430_{(1,2,3,4)}$ between adjacent processing units 320a, b is to use the local resources 330a-k, such as next-neighbor rings, for example. Accordingly, the resource manager 400 assigns the local resource 330a to transfer the packets $430_{(1,2,3,4)}$ between the source and sink processing units 320a, b over the packet channel 450. As shown, the global resource register 340a is inactive and is not used to transfer any of the packets $430_{(1,2,3,4)}$. Accordingly, the contents of the global resource register 340a are irrelevant.

The data links 420a, b, the local resource 330a, and the global resource 340a comprise the packet channel 450. The source and sink processing units 320a, 320b are executing functions for processing the packets $430_{(1,2,3,4)}$. The packet channel 450 is an abstraction indicating the packet data flow. As the packet traffic workload between the source and sink processing units 320a, 320b varies, the resource manager 400 may change the actual processor allocation from the source processing unit 320a to one or more different sink processing units 320b-k, for example, to dynamically adapt to the varying workload. To exploit this dynamic adaptation, the resource manager 400 selects a packet channel resource allocation corresponding to the processor allocation. For example, as previously disclosed, in one embodiment, the processor 300 may comprise a plurality of processing units 320a-k daisy chained with local resources 330a-k between respective adjacent processing units. The local resource 330a, which in one embodiment may comprise a next-neighbor ring, may be used to implement the packet channel 450 if the source and sink processing units 320a, b are adjacently mapped. If the source and sink processing units 320a, b are not adjacently mapped or if they are mapped to more than one processor 300, then the local resource 330a cannot easily be used, and instead, the resource manager 400 uses some other global hardware resource such as global resource register 340a, which in one embodiment may comprise a scratch ring, to implement the packet channel 450. A change in processor allocation will affect whether or not the local resources 330a-k can be used in a given implementation.

Adding or removing processing units 320a-k allocated to a source or sink processing unit 320a, b data flow actor should occur with minimal packet loss during the transition. The resource manager 400 provides a packet channel implementation that minimizes packet loss while still improving over packet channel implementations that use only the local resources 330a-k, for example. In one embodiment, the packet channel 450 implementation under the control of the resource manager 400 may comprise using a combination of both the local resources 330*a-k* and the global resource registers 340*a-k* and dynamically switching between the two resources in accordance with an algorithm, one embodiment of which is described below.

Figure 4B:
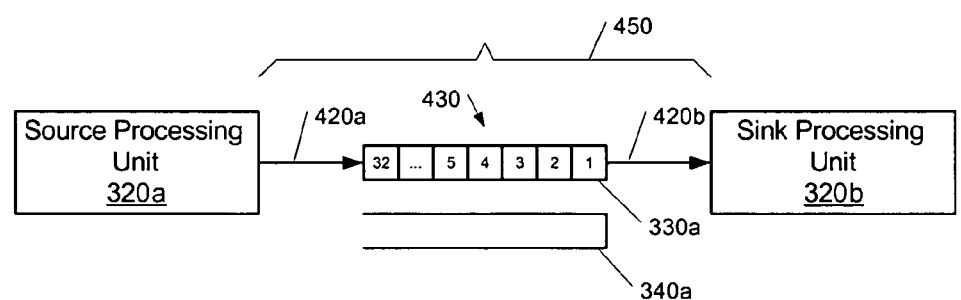

FIG. 4B illustrates a diagram depicting one embodiment of the transfer of data packets between processing units 320*a, b* under the control of the resource manager 400 when the sink processing unit 320*b* is unable to read the packets 430$_{(1,2,3,4,5\ldots 32)}$ from the packet channel 450 at the rate that the source processing unit 320*a* writes the packets 430$_{(1,2,3,4,5\ldots 32)}$ to the packet channel 450. Accordingly, the packet channel 450 eventually fills up with packets 430$_{(1,2,3,4,5\ldots 32)}$, for example, (e.g., for local resource capable of holding 32 packets). Unless the resource manager 400 intervenes, these conditions may lead to packet overflow in the packet channel 450 and a number of packets may be lost during the transmission. Accordingly, the resource manager 400 detects that an overflow condition is about to happen and, accordingly, may decide to allocate an additional sink processing unit 320*c-k* to assist the active sink processing unit 320*b* to alleviate this condition. In one embodiment, the resource manager 400 determines the occurrence of an overflow condition by monitoring the status of the local resource 330*a*. For example, if the local resource 330*a* is full, the resource manager 400 determines that there is an overflow condition in the packet channel 450. Prior to allocating any new sink processing units 320*c-k*, however, the resource manager 400 first activates the global resource register 340*a*.

Figure 4C:
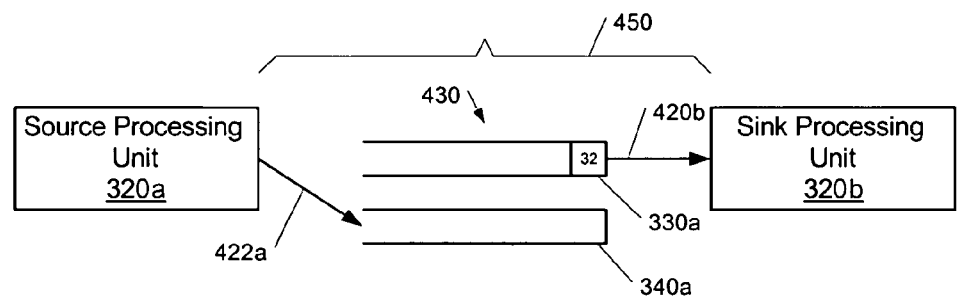

FIG. 4C illustrates a diagram depicting one embodiment of the transfer of data packets between processing units 320*a, b* under the control of the resource manager 400. Prior to initiating packet transfers from the newly activated global resource register 340*a*, the sink processing unit 320*b* first drains the remaining packets 430$_{(32)}$ from the local resource 330*a*. Accordingly, once the resource manager 400 detects that the sink processing unit 320*b* begins to lag behind the source processing unit 320*a*, and is unable to keep up with the packet flow workload, it activates the global resource register 340*a* and stops writing packets to the local resource 330*a*. The sink processing unit 320*b* completely flushes the local resource 330*a* of the remaining packets 430$_{(32)}$ before initiating packet reads from the global resource register 320*b*. Meanwhile, the source processing unit 320*a* continues writing packets to the global resource 340*a*, which was activated when the resource manger 400 detected that the local resource 330*a* was full. Emptying the local resource 330*a* is necessary at the sink processing unit 320*b* side of the packet channel 450 to maintain the packet order. Accordingly, as shown in FIG. 4C, the source processing unit 320*a* uses link 422*a* to write packets into the global resource 340*a* while the sink processing unit 320*b* is still reading the remaining packets from the local resource 330*a*.

Figure 4D:
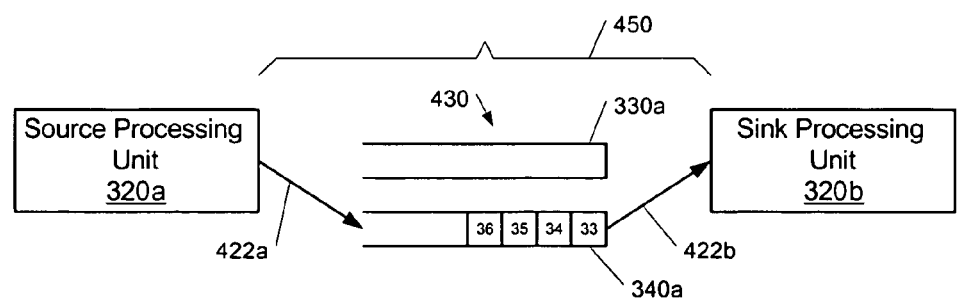

FIG. 4D illustrates a diagram depicting one embodiment of the transfer of data packets between processing units 320*a, b* under the control of the resource manager 400. As shown, the local resource 330*a* is now empty and the resource manager 400 deactivates it The resource manager 400 switches the packet channel implementation between the source processing unit 320*a* and the sink processing unit 320*b* to the global resource register 340*a* and input/output links 422*a*, 422*b*. The source processing unit 320*a* now writes new packets 470$_{(33, 34, 35, 36)}$ to the global resource register 340*a*. In one embodiment, the resource manager 400 is now ready to assign an additional sink processing unit to assist the sink processing unit 320*b*.

Figure 4E:
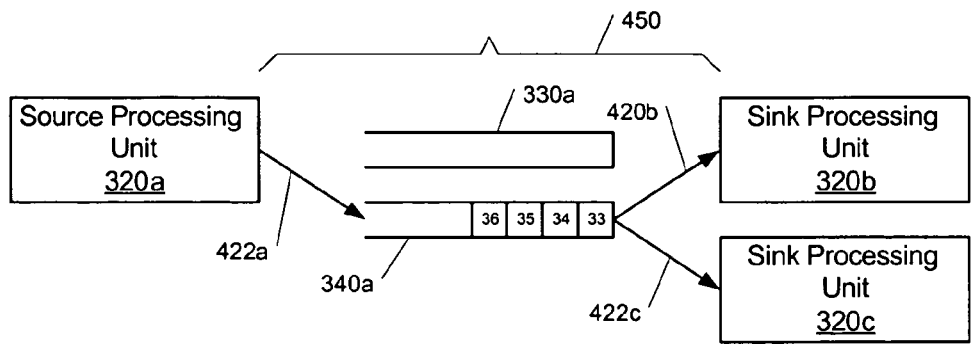

FIG. 4E illustrates a diagram depicting one embodiment of the transfer of data packets between processing units 320*a, b, c* under the control of the resource manager 400. The diagram further depicts the adaptation of an additional sink processing unit 320*c* to assist the processing unit 320*b* in reading the data packets 470$_{(33, 34, 35, 36)}$ in order to enable the sink processing unit 320*b* to keep up with the packet flow. Accordingly, the resource manager 400 adds a new output link 422*c* so that the sink processing unit 320*c* can read the packets 470$_{(33, 34, 35, 36)}$. The source processing unit 320*a* now writes the packets 470$_{(33, 34, 35, 36)}$ to the global resource register 340*a*, and both of the sink processing units 322*b, c* read the packets 470$_{(33, 34, 35, 36)}$ therefrom while the local resource 330*a* remains inactive. In addition, the resource manager 400 controls the packet flow process to ensure that access to the packets 470$_{(33, 34, 35, 36)}$ in the global resource register 340*a* is mutually exclusive between the two sink processing units 320*b, c*.

Figure 4F:
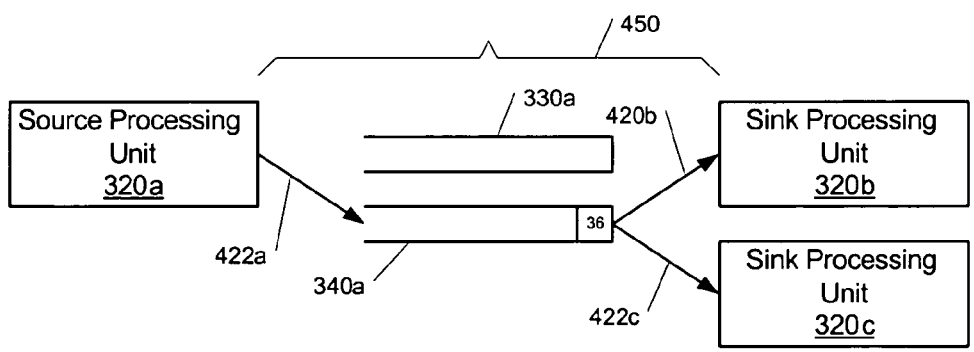

FIG. 4F illustrates a diagram depicting one embodiment of the transfer of data packets between processing units 320*a, b, c* under the control of the resource manager 400. When the packet traffic flow is reduced to a level that the sink processing unit 320*b* can manage, the resource manager 400 stops writing packets to the global resource register 340*a*. Prior to switching back to the original packet channel 450 using the local resource 330*a* to transfer the packets, however, the resource manager 400 flushes the global resource register 340*a* and ensures that the last packet 470$_{(36)}$ is read by either sink processing unit 320*b, c*. Once the last packet 470$_{(36)}$ is read and the global resource register 340*a* is empty, the resource manager 400 deactivates the global resource register 340*a* and begins to reestablish the original packet channel 450 using the local resource 330*a*.

Figure 4G:
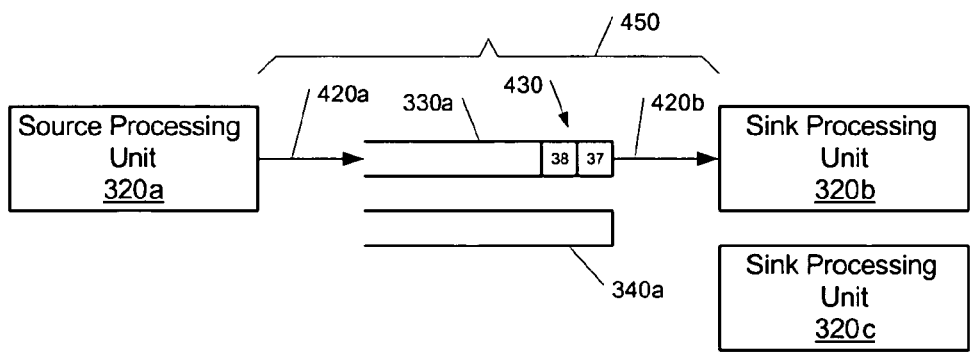

FIG. 4G illustrates a diagram depicting the transfer of data packets between processing units 320*a, b* under the control of the resource manager 400. When the packet flow traffic is reduced and the global resource register 340*a* is empty, the resource manager 400 reestablishes the original packet channel 450 and begins writing new packets 430$_{(37,38)}$ to the local resource 330*a*. Accordingly, only the adjacent sink processing unit 320*b* is utilized to read the packets 430$_{(37,38)}$ from the local resource 330*a*. At this point the resource manager 400 may decide if necessary, to remove the extra sink processing unit 320*c* without disrupting the current packet traffic flow in the channel 450.

Although the above example was disclosed with respect to local resources 330*a* and global resource registers 340*a*, it is to be understood these registers, in general, may be replaced by any efficient local resource implementation and any efficient global resource implementation. The term local resource is meant to comprise the usage of local resources that are constrained to certain processing units, for example, only to registers that are local to the processing units. The term global resource register is meant to comprise the usage of global resource registers that may be accessed from any processing unit or other processors, for example. The terms local resource, local resource ring, and next-neighbor rings may be used interchangeably. Likewise, the terms global resource register, global resource ring, and scratch ring may be used interchangeably.

In one embodiment, the resource manager 400 may be implemented using the following algorithm comprising the pseudo code for two methods of the packet channel implementation: 'put' and 'get.'

The method 'put' is used by a data flow actor, such as the source processing unit 320*a*, to send a packet to the channel 450, for example.

```
put_accelerated (handle)
{
    if(global resource register empty) // this causes the transition
from the global resource register to the local resource when the traffic
decreases
    {
        if(!local resource full) // this causes the transition from the local
resource to the global resource register when the traffic increases
        {
            put on local resource
        }
        else
        {
          put on global resource register
        }
    }
    else
    {
// if global resource register is not empty. This ensures that as soon
as the decision to switch to the global resource register is made
(by placing one piece of data on the global resource register),
the subsequent data is also placed on the global resource register.
            put on global resource register
    }
}
```

The method 'get' is used by a data flow actor, such as the sink processing units 320*b*, *c*, to receive a packet from the channel 450, for example.

```
handle get_accelerated( )
{
  if(!local resource empty) //this ensures that the data in the local resource
ring is drained before anything is read from the global resource register
  {
      get from local resource ring
  }
  else
  {
      get from global resource register
  }
}
//For the code loaded on the new processor the following version can be
added in:
handle get ( )
{
  get from global resource register
}
```

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 5:
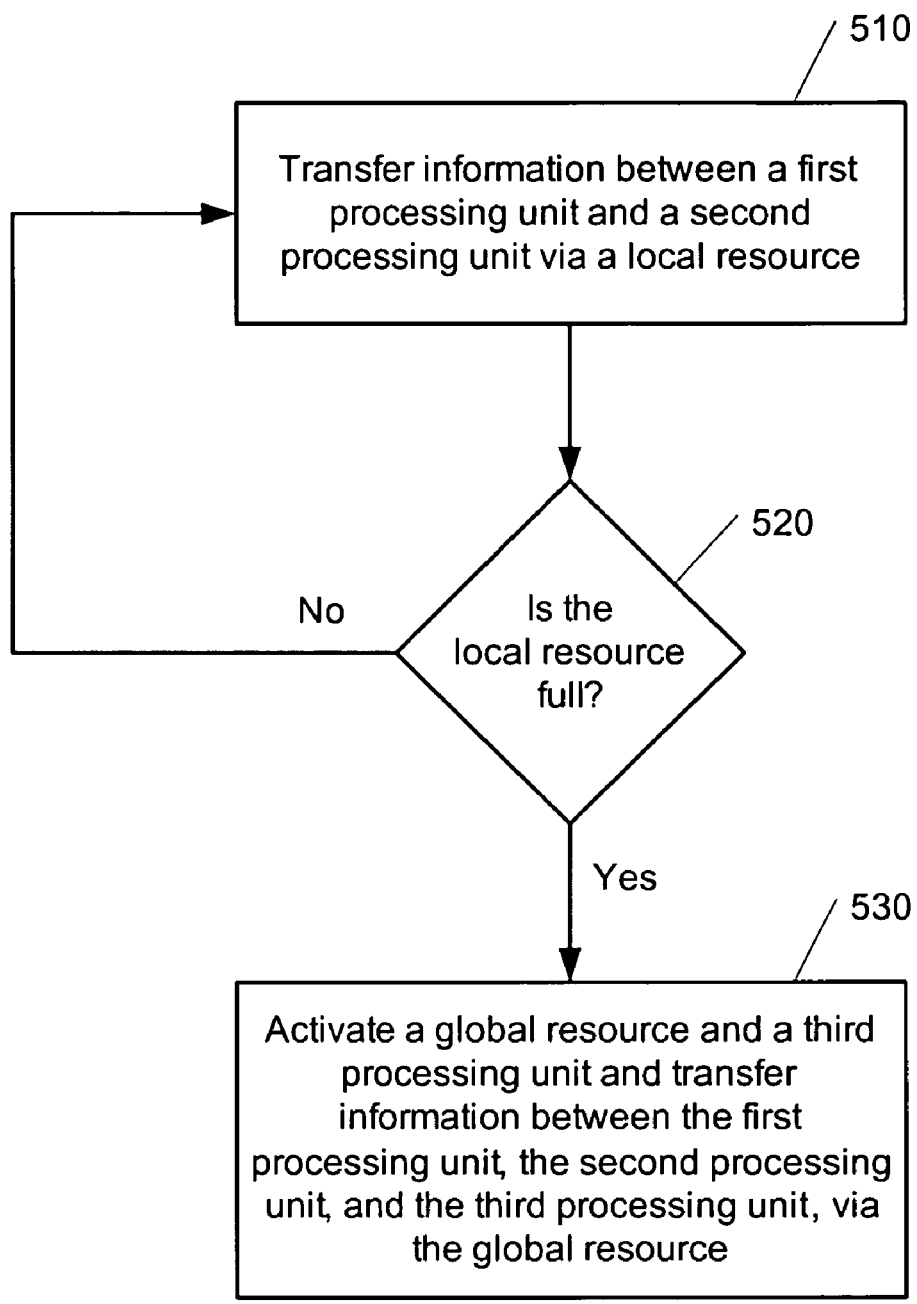
FIG. 5 illustrates one embodiment of a programming logic 500.

FIG. 5 illustrates one embodiment of a programming logic. FIG. 5 illustrates a block flow diagram of a programming logic 500. Programming logic 500 may be representative of the operations executed by one or more systems described herein, under the control of the resource manager 400. As shown in programming logic 500 at block 510 the resource manager 400 controls the transfer of information between a first processing unit and a second processing unit via a local resource. At decision block 520, the resource manager 400 determines if the local resource is full. If the local resource is not full, then the second processing unit is keeping up with the information flow rate and the process continues along 'No' path back to block 510. If the local resource is full, then the second processing unit is lagging the first processing unit, and at block 530, the resource manager activates a global resource and a third processing unit and controls the transfer of information between the first processing unit, the second processing unit, and the third or more processing units, via the global resource.

In one embodiment, if the local resource is full, the second processing unit empties the local resource prior to reading information from the global resource. In another embodiment, if the global resource is empty, the resource manager 400 controls the transfer of information between the first processing unit and the second processing unit via the local resource. Further, if the global resource is empty, the resource manager 400 disables the third processing unit. In yet another embodiment, the resource manager 400 transfers the information between the first processing unit, the second processing unit, and the third processing unit, via the global resource and the second processing unit reads information from the global resource exclusively of the third processing unit. Further, the third processing unit reads information from the global resource exclusively of the second processing unit.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, programmable logic device (PLD), programmable gate array (PGA), FPGA, or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a first processing unit;
a second processing unit adjacent to said first processing unit;
a third processing unit non-adjacent to said first processing unit;
a neighborhood register ring to transfer information between said first processing unit and said second processing unit, wherein said neighborhood register ring is to transfer information between any two adjacent processing units;
a resource manager to manage information transfers between said neighborhood register ring and a scratch ring; and
when said second processing unit and the neighborhood register ring are full, the resource manager to activate the scratch ring to receive information from the first processing unit and transfer information to said second processing unit and said third processing unit, and when said second processing unit is not full, the resource manager to empty said scratch ring of information by transferring information to said second processing unit and said third processing unit.

2. The apparatus of claim 1, wherein said scratch ring is to transfer information between any processing units.

3. The apparatus of claim 1, wherein said resource manager activates said third processing unit to prevent an overflow.

4. The apparatus of claim 1, wherein, said neighborhood register ring is to transfer information when said scratch ring is empty.

5. A system, comprising:
a network forwarding device having a switch fabric and line cards;
a processing device to couple to said network forwarding device, said processing device having processors to process information;
a neighborhood register ring to transfer information between a first processing unit and a second processing unit, wherein said neighborhood register ring is to transfer information between any two adjacent processing units; and
when said second processing unit and a neighborhood register ring are full, a resource manager to activate a scratch ring to receive information from said first processing unit and transfer information to said second processing unit and a non-adjacent third processing unit, and when said second processing unit is not full, the resource manager to empty said scratch ring of information by transferring information to said second processing unit and said third processing unit.

6. The system of claim 5, wherein said scratch ring is to transfer information between any processing units.

7. The system of claim 5, wherein said scratch ring to transfer information to said third processing unit to prevent an overflow.

8. The system of claim 5, wherein, said neighborhood register ring is to transfer information when said scratch ring is empty.

9. A method, comprising:
transferring information between a first processing unit and a second processing unit via a neighborhood register ring, wherein said neighborhood register ring is to transfer information between any two adjacent processing units; and
if said second processing unit and a neighborhood register ring are full,
activating a scratch ring by a resource manager,
activating a third processing unit transferring information from said first processing unit to said second processing unit and said third processing unit, via scratch ring wherein the scratch ring is to transfer information between non-adjacent processing units; and
when said second processing unit is not full, the resource manager to empty said scratch ring into said second processing unit and said third processing unit.

10. The method of claim 9, further comprising:
if said scratch ring is empty, transferring information between said first processing unit and said second processing unit via said neighborhood register ring.

11. The method of claim 10, further comprising:
if said scratch ring is empty, disabling said third processing unit.

12. The method of claim 9, wherein transferring information between said first processing unit, said second processing unit, and a third processing unit, via a scratch ring comprises:

said second processing unit reading information from said scratch ring exclusively of said third processing unit; and said third processing unit reading information from said scratch ring exclusively of said second processing unit.

13. An article of manufacturing, comprising:

a storage medium;

said storage medium including stored instructions that, when executed by a processor, are operable to transfer information between a first processing unit and a second processing unit via a neighborhood register ring, wherein said neighborhood register ring is to transfer information between any two adjacent processing units; and when said second processing unit and a neighborhood register ring are full, activate a scratch ring, a third processing unit via a resource manager, receive information from said first processing unit and transfer information to said second processing unit and said third processing unit via said scratch ring, and when said second processing unit is not full, empty said scratch ring, via the resource manager, by transferring information into said second processing unit and said third processing unit.

14. The article of claim 13, wherein the stored instructions, when executed by a processor, are to transfer information between said first processing unit and said second processing unit via said neighborhood register ring, if said scratch ring is empty.

15. The article of claim 14, wherein the stored instructions, when executed by a processor, are to disable said third processing unit, if said scratch ring is empty.

16. The article of claim 13, wherein the stored instructions, when executed by a processor, are to control said second processing unit to read information from said scratch ring exclusively of said third processing unit; and to control said third processing unit to read information from said scratch ring exclusively of said second processing unit.

* * * * *

UNITED STATES PATENT AND TRADEMARK OFFICE
CERTIFICATE OF CORRECTION

| | | |
|---|---|---|
| PATENT NO. | : 8,117,620 B2 | Page 1 of 1 |
| APPLICATION NO. | : 11/086617 | |
| DATED | : February 14, 2012 | |
| INVENTOR(S) | : Arun Raghunath et al. | |

It is certified that error appears in the above-identified patent and that said Letters Patent is hereby corrected as shown below:

In column 18, line 54, in claim 9, after "via" insert -- said --.

In column 20, line 4, in claim 13, delete "into" and insert -- to --, therefor.

Signed and Sealed this
Eighteenth Day of September, 2012

David J. Kappos
*Director of the United States Patent and Trademark Office*